United States Patent [19]

Merz et al.

[11] Patent Number: 5,558,831
[45] Date of Patent: Sep. 24, 1996

[54] HINGE HEATING AND FOLDING METHOD

[75] Inventors: Gary E. Merz; Edward B. Richter; Robert W. Sanford, all of Rochester; Jack Magliocco, Hilton, all of N.Y.

[73] Assignee: Eastman Kodak Company, Rochester, N.Y.

[21] Appl. No.: 391,895

[22] Filed: Feb. 20, 1995

[51] Int. Cl.⁶ .................................................. B29C 53/04
[52] U.S. Cl. ........................................ 264/492; 264/339
[58] Field of Search ..................................... 264/339, 492

[56]  References Cited

U.S. PATENT DOCUMENTS

| | | | |
|---|---|---|---|
| 3,104,846 | 9/1963 | Ringle | 242/348.4 |
| 3,128,058 | 4/1964 | Ringle et al. | 242/348.4 |
| 3,222,437 | 12/1965 | Schilling | 264/54 |
| 3,301,430 | 1/1967 | Cornelius | 220/334 |
| 3,320,225 | 5/1967 | Bradbury | 428/156 |
| 4,223,852 | 9/1980 | Neuhold | 242/348.4 |

*Primary Examiner*—Leo B. Tentoni
*Attorney, Agent, or Firm*—Arthur H. Rosenstein

[57] ABSTRACT

A method to locally heat a thermoplastic hinge and fold its semicylindrical members together so as to form a film cartridge. The cooled integrated hinge is locally heated in a manner whereby the semicylindrical members remain cool. When the thermoplastic hinge is ductile from the heat, the semicylindrical members are folded together.

4 Claims, 4 Drawing Sheets

5,558,831

HINGE HEATING AND FOLDING METHOD

FIELD OF INVENTION

The present invention relates to a method to heat and form a plastic hinge. More particularly, the present invention relates to a method to assemble a roll film cartridge from a cooled thermoplastic mold.

BACKGROUND OF THE INVENTION

It is known that roll film cartridges are constructed from metal or plastic. Plastic is a desirable material because of its light weight, strength and low cost. Standard methods of assembly exist for plastic components.

The two most common methods of assembling a roll film cartridge are presented in U.S. Pat. No. 3,128,058. The first method fastens two separately molded semicylindrical members together with a retaining clip or tape. A disadvantage of this process is the large number of individual components to be assembled. The second most common method of assembly has the two molded semicylindrical members joined by an integrated hinge along one longitudinal edge and a fastening means along the other. Generally, the roll film cartridge is formed by folding the semicylindrical members together before the hinge and members have substantially cooled.

For plastic hinges that must be capable of repeated flexing, numerous patents note that folding must occur before substantial cooling. This affects the flexibility of the manufacturing process, since it requires immediate action after injection molding. Plastic materials are comprised of long molecular chains and amorphous binders between these chains. When a plastic component is extruded the molecules tend to align themselves with the extrusion flow. U.S. Pat. No. 3,320,225 describes the process whereby the molecular chains of the thermoplastic may be reoriented to increase the flexure strength. When rolls apply a continuous pressure upon an extruded plastic hinge, the rolls reduce the plastic's cross section and consequently reorient the molecules. Location of the rolls relative to the extruder die orifice is critical because the working temperature range is narrow and temperature drops with distance from the die.

U.S. Pat. No. 3,301,430 describes the process of setting the extruded hinge into a fixed position as it cools, as well as flexing the hinge one to four times to reorient the materials before setting the hinge into a position for cooling. Again, application of this process to roll film cartridge assembly limits the flexibility for manufacturing. A need exists to manufacture the components separately and to assemble them after they have cooled.

When cool, the process of folding together the semicylindrical members creates stress cracks in the hinge, which may lead to a structural failure. Experimentation has shown that reheating the hinge anneals the plastic material and significantly increases its strength. Numerous means exist to reheat a substantially cooled roll film cartridge, but none localize the heat.

The heating must be localized at the hinge in order to prevent the possibility of structural changes in the semicylindrical members. The present invention uses directed hot air. Alternative means of localized heating include lasers and fiber optic light sources; however, the energy necessary from these systems to rapidly heat a hinge tends to either burn holes in the plastic or heat the hinge beyond the point of structural integrity. The heated air system, which combines convective and conductive heat trasfer, has the capability of penetrating the thickness of a plastic component without damaging the surface.

The present invention solves problems associated with the development of a sturdy, one piece, light proof cartridge. The present invention provides a means to fold a plastic component after it has been molded and substantially cooled. The present invention also provides a method to isolate the hinge and locally heat the hinge without affecting the structural integrity of the whole cartridge.

SUMMARY OF THE INVENTION

The present invention assembles a roll film cartridge by heating and folding an integrated hinge. A cooled unfolded cartridge with associated component parts is placed on a hinge heating nest, which directs controlled hot air to locally heat the hinge in under one second. When the hinge is ductile, the cartridge is placed in a second nest where a rotating arm folds the semicylindrical members together. Fasteners along the longitudinal edge of the members seal the cartridge closed.

The present invention has several advantages over the prior art. Localized heating with directed air allows full heat penetration into the hinge without heating the semicylindrical members and affecting the general structural integrity of the cartridge. The design also allows heating the hinge in under one second to improve cycle time. By establishing a means to reheat and fold a substantially cooled cartridge, the present invention provides flexibility to the manufacturing process and schedule.

For a better understanding of the present invention together with other objects, advantages and capabilities thereof, reference is made to the following description and appended claims in connection with the above described drawings.

DETAILED DESCRIPTION OF THE INVENTION

Figure 1:
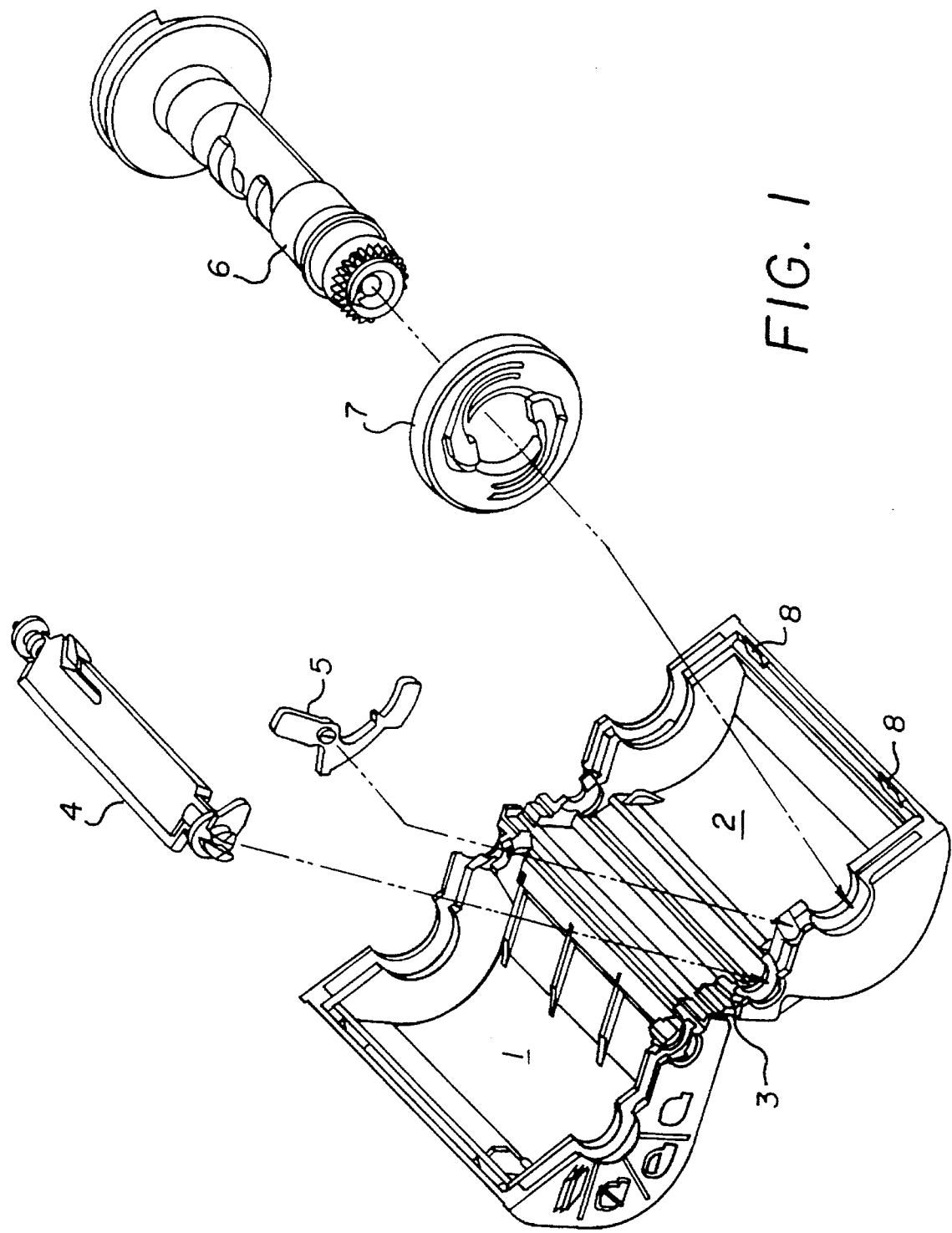
FIG. 1 is an exploded view of the cartridge.

FIG. 1 shows the components of a film cartridge. The unfolded cartridge is comprised of two semicylindrical members 1,2 and an integrated hinge 3. Initially, the door 4, the spool lock 5, the spool 6, and the disk 7 are inserted into the unfolded cartridge before heating and folding. The two semicylindrical members 1,2 fasten together by snaps 8.

Figure 2:
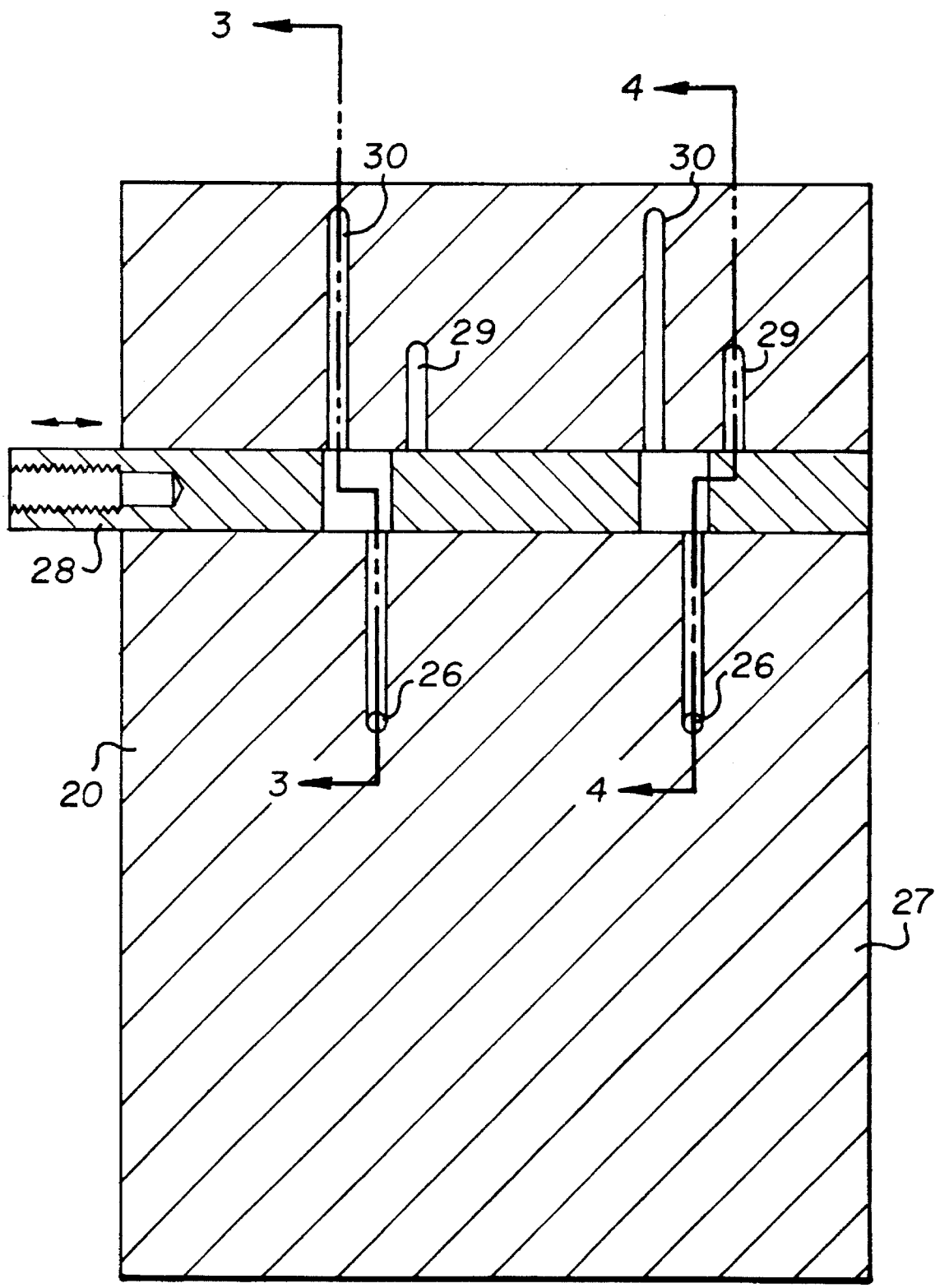
FIG. 2 is a cross-sectional front view of the hinge heating nest.
Figure 4:
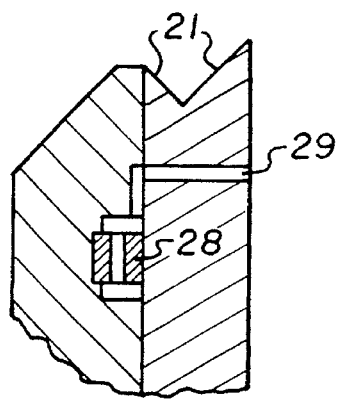
FIG. 4 is a sectional side view on line 4—4 of the hinge heating nest showing the exhaust port.
Figure 3:
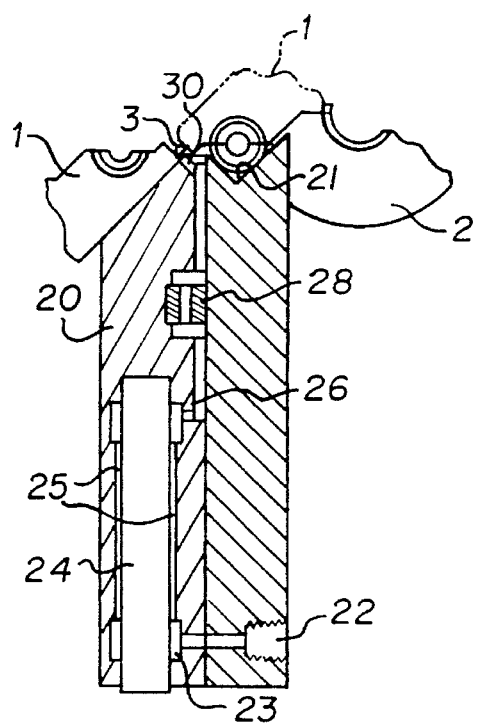
FIG. 3 is a sectional side view on line 3—3 of the hinge heating nest.

FIGS. 2, 3, and 4 are sectional, front and side views of the hinge heating nest. The unfolded cartridge is placed in a cradle 21 of a hinge heating nest 20. Compressed air is pumped through a flowmeter (not shown) and enters the hinge heating nest 20 which can be, for example, a parabolic infrared line heater through one or more ports 22. The compressed air enters a lower annular ring 23, which encompasses a heater core 24. The lower annular ring 23 distributes the compressed air into a passage 25, which surrounds the heater core 24, and then is collected in an upper annular ring 26. A heat resistant material, preferably G-7 phenolic or super mica, encases the heater core 24, thereby increasing the efficiency of heat transfer to the compressed air. The heated compressed air then enters a slide valve 28. The slide valve 28 directs the air either to an exit port 29, which exhausts the air away from the hinge 3, or to a port 30, which is aimed at the hinge 3 in the cradle 21. The air is diverted through the exit port in order to maintain a consistent air temperature around the heater, as opposed to turning the air on and off. This maintains equilibrium and reduces cycle time.

Figure 5:
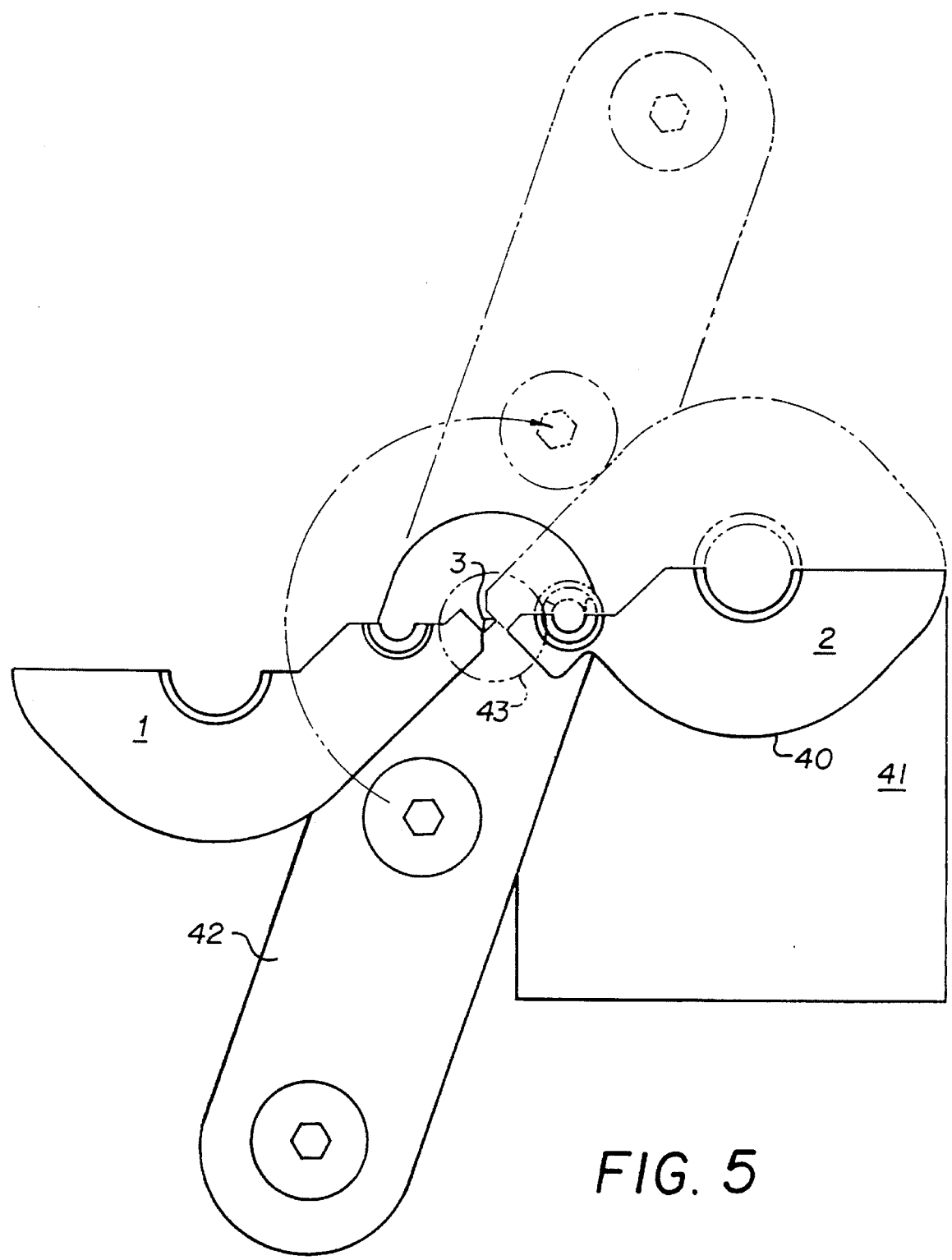
FIG. 5 is a cross-sectional view of the folding nest.

After one second the cartridge is placed in a cradle 41 of a second nest 40. FIG. 5 is a side view of the folding mechanism. While the plastic hinge 3 is still ductile from the heat, the rotating arm 42 pivots on its center 43 and folds the semicylindrical members 1,2 together and the snaps 8 (not shown in FIG. 5) are engaged. The cartridge is then returned to a conveyor (not shown) for cooling and labeling.

Figure 6:
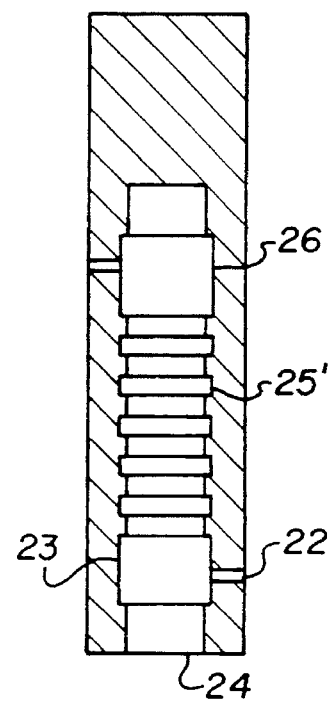
FIG. 6 is a sectional view of an alternative path for longitudinal airflow along the heating core.

FIG. 6 is a sectional view of an alternative path for longitudinal airflow along the heating core. A spiral chamber 25' connects the lower annular ring 23 with the upper annular ring 26. The spiral chamber 25' provides a more efficient exchange of heat from the heater core 24 to the compressed air.

While there has been shown and described what are at present considered the preferred embodiments of the invention, it will be obvious to those skilled in the art that various changes, alterations and modifications may be made therein without departing from the scope of the invention as defined by the following claims.

What is claimed is:

1. A method for relatively heating and folding a pair of members molded from a thermoplastic material, said members being joined by at least one integrally molded flexible hinge of said material, said members and said hinge having cooled substantially following molding thereof, comprising:

a) applying heat substantially only to said cooled hinge by controlled hot air to locally raise the temperature of said hinge to a level at which said material becomes more ductile while said material in said members remains cool;

b) folding said members by flexing said hinge while said hinge is more ductile; and c) Allowing said hinge to cool.

2. The method according to claim 1, wherein said thermoplastic material is polystyrene.

3. The method according to claim 1, wherein said cooled hinge is heated by a parabolic infrared line heater.

4. The method according to claim 1, wherein said folded members form a film cartridge.

* * * * *